Jan. 20, 1959 R. D. WARDELL 2,869,886
HAND TRUCK
Filed Jan. 25, 1957 2 Sheets-Sheet 1
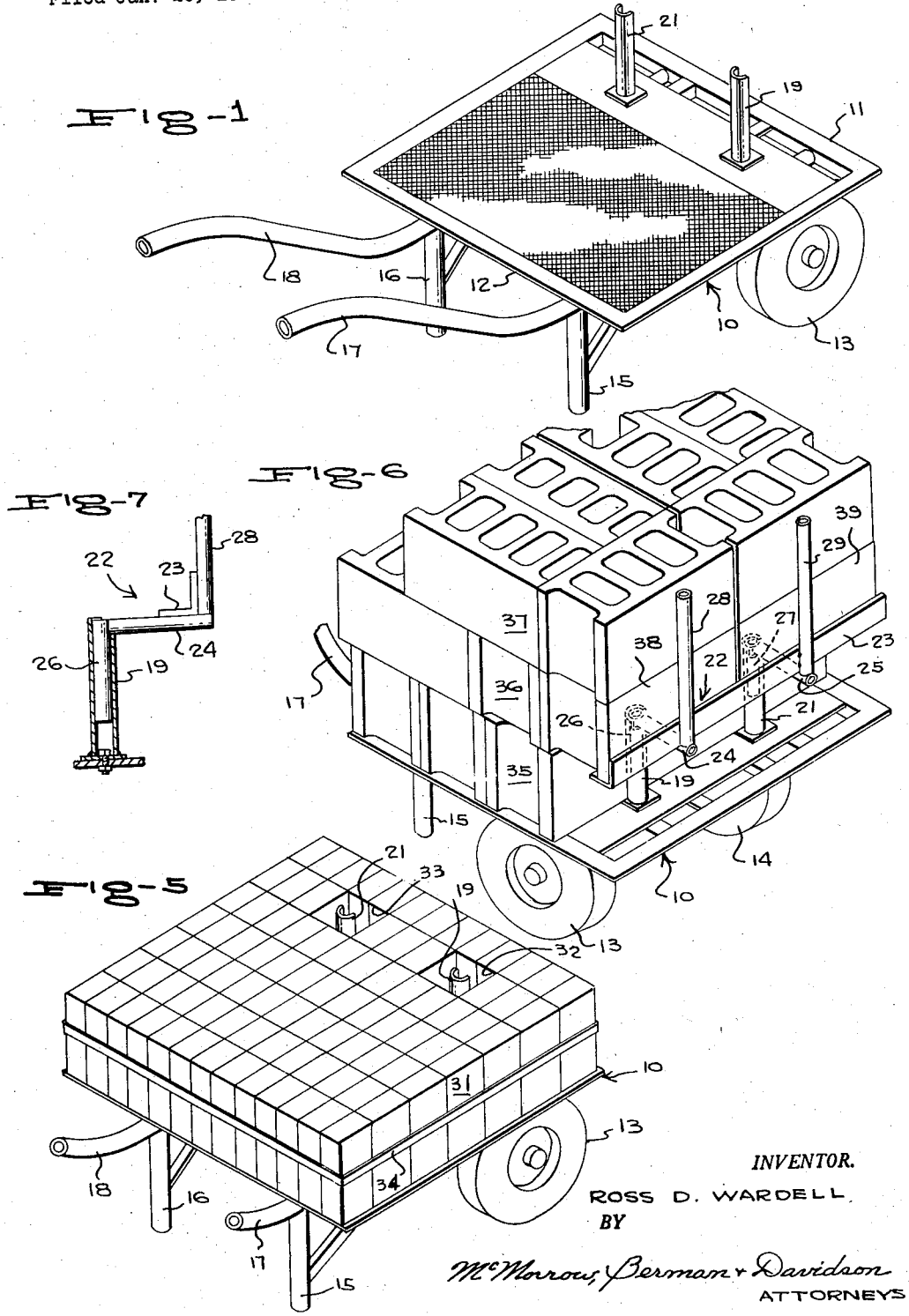
INVENTOR.
ROSS D. WARDELL,
BY
McMorrow, Berman & Davidson
ATTORNEYS

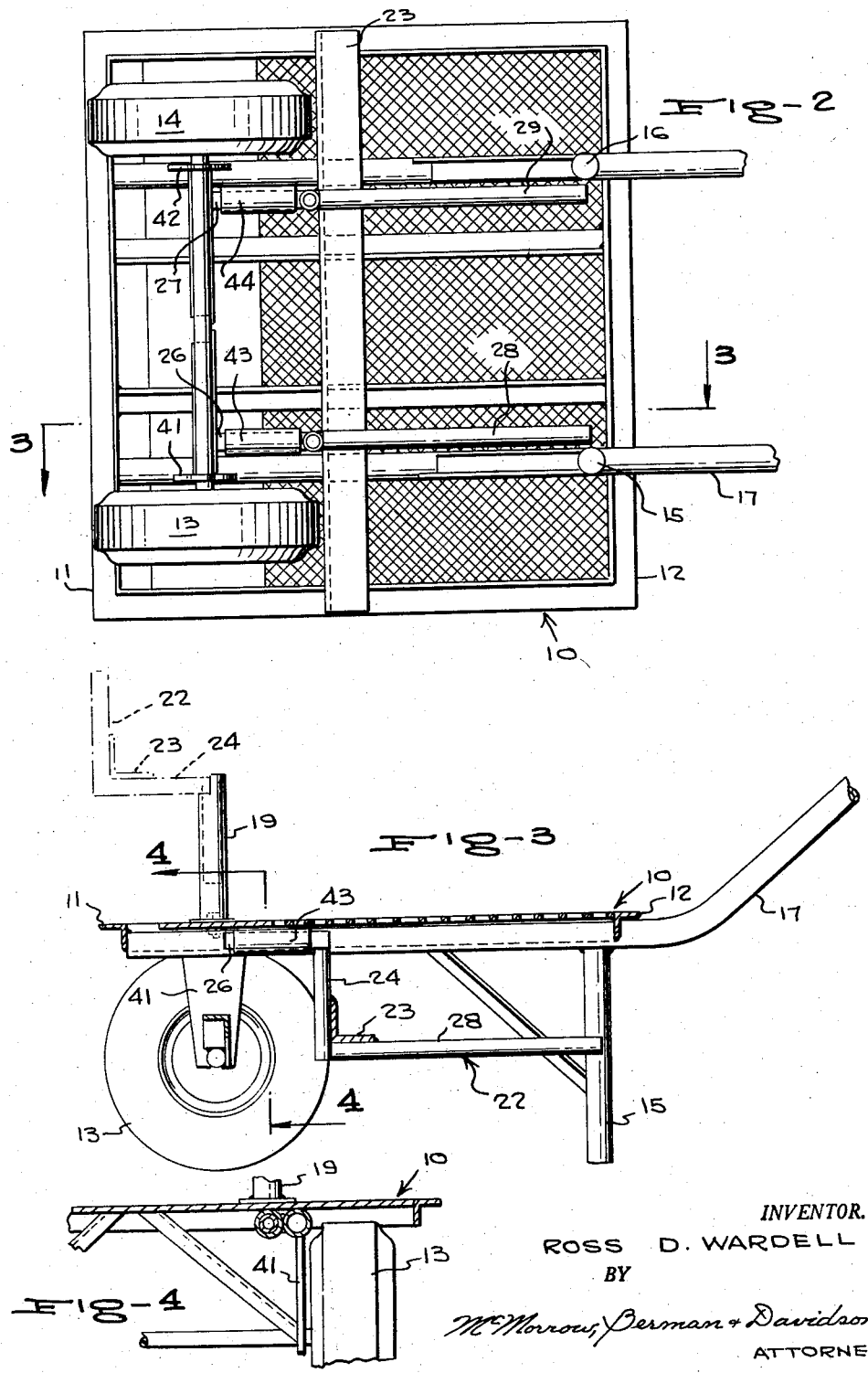

United States Patent Office 2,869,886
Patented Jan. 20, 1959

2,869,886

HAND TRUCK

Ross D. Wardell, Basin, Wyo.

Application January 25, 1957, Serial No. 636,402

1 Claim. (Cl. 280—47.18)

The present invention relates to a hand truck for bricks and building blocks.

An object of the present invention is to provide a hand truck which lends itself to the efficient carrying of a bound unit of bricks arranged in stacked relation.

Another object of the present invention is to provide a hand truck which lends itself to efficient carrying of a stack of building blocks.

A further object of the present invention is to provide a hand truck which is easily and quickly converted from a truck for carrying a bound unit of brick to a truck for carrying a stack of building blocks.

A still further object of the present invention is to provide a hand truck which is sturdy in construction, simple in structure and one which is economically feasible.

These and other objects and advantages of the present invention will be fully apparent from the following description when taken in connection with the annexed drawings, in which:

Figure 1 is a perspective view of the hand truck of the present invention in condition for carrying a bound unit of bricks, Figure 2 is a bottom view, on an enlarged scale, of the assembly of Figure 1, Figure 3 is a sectional view taken on the line 3—3 of Figure 2, the dotted lines indicating an auxiliary platform attached to the truck of the present invention, Figure 4 is a fragmentary sectional view taken on the line 4—4 of Figure 3, Figure 5 is a perspective view of the hand truck according to the present invention with a bound unit of stacked bricks positioned thereon, Figure 6 is a perspective view of the hand truck with a stack of building blocks positioned thereon, and Figure 7 is a view partially in section of the auxiliary platform portion of the hand truck according to the present invention.

Referring in greater detail to the drawings in which like numerals indicate like parts throughout the several views, the hand truck according to the present invention comprises a horizontally disposed platform designated generally by the reference numeral 10 and having a forward end 11 and a rearward end 12. A pair of laterally spaced wheels 13 and 14 are positioned below the platform 10 and adjacent the forward end 11 thereof. The wheels 13 and 14 rollably support the forward end of the platform 10 upon a ground surface when the hand truck according to the present invention is in use.

A pair of laterally spaced legs 15 and 16 are positioned below the platform 10 adjacent their rearward end 12 and support the rearward end 12 above the ground surface when the platform is in the horizontal position.

A pair of laterally spaced handle bars 17 and 18 project from the space beneath the platform 10 and are attached to the rearward end of the platform 10.

The hand truck thus described is of conventional construction and the present invention resides in an improvement in such hand truck, the improvement consisting in at least two uprights 19 and 21 arranged in lateral aligned spaced relation and positioned inwardly of and in parallel spaced relation with respect to the forward end 11 of the platform 10. An auxiliary platform, designated generally by the reference numeral 22, is provided by the present invention and consists in a horizontally disposed ledge 23 positioned above the platform 10 at a level above the upper ends of the uprights 19 and 21 and between the uprights 19 and 21 and the forward end 11 of the platform 10. The ledge 23 is of a rightangle cross sectional configuration and extends parallel to the forward end 11 of the platform 10 and is demountably supported by the uprights 19 and 21 by means of horizontally disposed tubular members 24 and 25. Vertically extending pins 26 and 27 are dependingly secured to the one ends of the members 24 and 25, respectively, remote from the ledge 23 and are received within the open upper ends of the uprights 19 and 21, respectively, when the auxiliary platform 22 is added to the hand truck of the present invention as shown in dotted lines in Figure 3 and in solid lines in Figures 6 and 7.

A pair of spaced posts 28 and 29 are positioned intermediate the ends of the ledge 23 and have their lower ends secured to the ledge 23 and also to the adjacent ends of the tubular members 24 and 25, respectively.

In use, the hand truck of the present invention may be used, as shown in Figure 5, to carry a bound unit of bricks arranged in stacked relation. The package or bound unit of bricks, designated by the reference numeral 31, is provided with holes 32 and 33 during its assembly and a steel strap 34 securely holds the bricks in stacked relation. The unit 33 is normally stored in a vertical position with the holes 32 and 33 adjacent the lower ends. Upon tilting movement of the platform 10 from the horizontal position to a position approaching the vertical in which the forward end 11 rests on and abuts a ground surface, the hand truck may be moved forwardly to where the uprights 19 and 20 enter the holes 32 and 33, respectively. The unit 31 is then pulled forwardly toward the hand truck so that the uprights 19 and 21 support the unit 31 as it is being lowered to the horizontal position for transporting the unit 31 to another location.

The auxiliary platform 22 may also be mounted with the pins 26 and 27 in the upper ends of the uprights 19 and 21, respectively, and a layer of building blocks, designated by the reference numeral 35 may be arranged in side-by-side abutting relation upon the platform 10 and at least two superimposed layers 36 and 37 of building blocks each having the blocks arranged in side-by-side abutting relation may be stacked upon the one layer 35 occupying the portion of the platform inwardly of the uprights 19 and 21 with certain of the blocks 38 and 39 resting upon the ledge 23 and the tubular members 24 and 25. Inwardly of each of the handle bars 17 and 18 and adjacent the axle supporting members 41 and 42 is secured an open-ended tubular member 43 and 44 receiving the pins 26 and 27 of the auxiliary platform 22 when the auxiliary platform 22 is not in use. This permits the easy attachment of the auxiliary platform 22 to the underside of the platform 10 and enables the user of the hand truck to have instantly available the auxiliary platform 22 whenever it is desired to shift from the form of the hand truck for carrying the unit 31 to the form of the hand truck for carrying the building blocks in the layers 35 to 37, inclusive.

What is claimed is:

In a hand truck comprising a horizontally disposed platform having a forward end and a rearward end, a pair of laterally spaced wheels positioned below and adjacent the forward end of said platform and rollably supporting the forward end of said platform upon a ground surface, a pair of laterally spaced legs positioned below and adjacent the rearward end of said platform and supporting the rearward end of said platform above said ground surface when said platform is in the horizontal position, and laterally spaced handle bars projecting from and attached to the rearward end of said platform, said platform being tiltable from the horizontal position to a vertical position in which the forward end abuts said ground surface, the improvement consisting in at least two uprights arranged in lateral aligned spaced relation positioned inwardly of and in parallel spaced relation with respect to the forward end of said platform, a ledge positioned above said platform at a level above said uprights and between said uprights and the forward end of said platform and extending parallel to the forward end of said platform and supported by said uprights, and at least a pair of spaced posts positioned intermediate the ends of said ledge and carried by said ledge.

References Cited in the file of this patent

UNITED STATES PATENTS

| | | |
|---|---|---|
| 757,068 | Swift | Apr. 12, 1904 |
| 1,150,964 | Phelps | Aug. 24, 1915 |
| 1,460,266 | Monroe | June 26, 1923 |
| 2,514,972 | Reed | July 11, 1950 |
| 2,678,150 | Lund | May 11, 1954 |
| 2,721,086 | Gorley | Oct. 18, 1955 |
| 2,814,402 | Schaefer | Nov. 26, 1957 |
| 2,818,988 | Dunkin | Jan. 7, 1958 |

FOREIGN PATENTS

| | | |
|---|---|---|
| 790,938 | France | Nov. 29, 1935 |
| 417,311 | Germany | Aug. 13, 1925 |
| 749,545 | Great Britain | May 30, 1956 |